United States Patent
Ya et al.

(10) Patent No.: US 12,214,418 B2
(45) Date of Patent: Feb. 4, 2025

(54) DEVICE FOR IMPROVING QUALITY OF ALUMINUM ALLOY HORIZONTAL CONTINUOUS CASTING BILLET BY APPLYING ULTRASONIC TREATMENT

(71) Applicants: Dalian University of Technology, Dalian (CN); NingBo Institute of Dalian University of Technology, Ningbo (CN)

(72) Inventors: Bin Ya, Dalian (CN); Xingguo Zhang, Dalian (CN); Linggang Meng, Dalian (CN); Bingwen Zhou, Dalian (CN); Changzhi Shan, Ningbo (CN); Yunfeng Liu, Ningbo (CN)

(73) Assignees: Dalian University of Technology, Dalian (CN); NingBo Institute of Dalian University of Technology, Ningbo (CN)

( * ) Notice: Subject to any disclaimer, the term of this patent is extended or adjusted under 35 U.S.C. 154(b) by 0 days.

(21) Appl. No.: 18/609,361

(22) Filed: Mar. 19, 2024

(65) Prior Publication Data
US 2024/0316623 A1    Sep. 26, 2024

(30) Foreign Application Priority Data
Mar. 20, 2023   (CN) .......................... 202310270456.9

(51) Int. Cl.
*B22D 11/114*    (2006.01)
*B22D 11/00*    (2006.01)
*B22D 11/045*    (2006.01)

(52) U.S. Cl.
CPC .......... *B22D 11/114* (2013.01); *B22D 11/003* (2013.01); *B22D 11/045* (2013.01)

(58) Field of Classification Search
CPC ...... B22D 11/045; B22D 11/11; B22D 11/114
See application file for complete search history.

(56) References Cited

U.S. PATENT DOCUMENTS
2022/0048105 A1   2/2022  Han

FOREIGN PATENT DOCUMENTS
CN    101244451 A    8/2008
CN    101773907 A    7/2010
(Continued)

OTHER PUBLICATIONS
First Office Action for China Application No. 202310270456.9, mailed Sep. 7, 2023.

*Primary Examiner* — Kevin E Yoon
(74) *Attorney, Agent, or Firm* — Piloff Passino & Cosenza LLP; Rachel Piloff; Sean Passino

(57) ABSTRACT

A device for improving quality of aluminum alloy horizontal continuous casting billet by applying ultrasonic treatment is provided, including an ultrasonic generator, an ultrasonic transducer, an amplitude transformer, a holding furnace, an ultrasonic probe and a traction device. The ultrasonic generator is electrically connected with the ultrasonic transducer; the ultrasonic transducer is threadedly connected with the ultrasonic probe through the amplitude transformer, and the ultrasonic probe is placed in the holding furnace; a communication opening is formed at a bottom of the holding furnace, and the traction device is installed at the communication opening; the holding furnace is further poured with metal liquid.

4 Claims, 1 Drawing Sheet

(56) References Cited

FOREIGN PATENT DOCUMENTS

| | | | | | |
|---|---|---|---|---|---|
| CN | 102489676 | A | * | 6/2012 | |
| CN | 102978412 | A | | 3/2013 | |
| CN | 104057040 | A | | 9/2014 | |
| CN | 104384483 | A | | 3/2015 | |
| CN | 104907514 | A | | 9/2015 | |
| CN | 105397043 | A | | 3/2016 | |
| CN | 107028643 | A | | 8/2017 | |
| CN | 107030266 | A | * | 8/2017 | |
| CN | 108188362 | A | | 6/2018 | |
| CN | 110216251 | A | | 9/2019 | |
| CN | 215998665 | U | | 3/2022 | |
| CN | 216828557 | U | | 6/2022 | |
| JP | 56055530 | A | * | 5/1981 | ............... B22D 1/00 |

\* cited by examiner

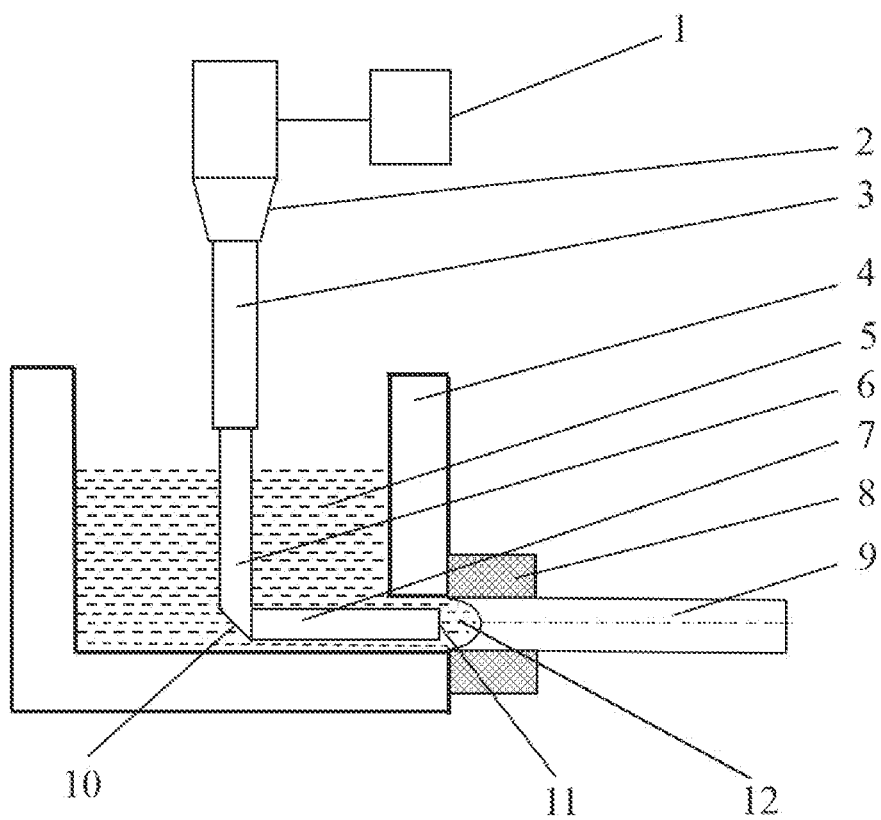

DEVICE FOR IMPROVING QUALITY OF ALUMINUM ALLOY HORIZONTAL CONTINUOUS CASTING BILLET BY APPLYING ULTRASONIC TREATMENT

CROSS-REFERENCE TO RELATED APPLICATIONS

This application claims priority of Chinese Patent Application No. 202310270456.9, filed on Mar. 20, 2023, the entire contents of which are incorporated herein by reference.

TECHNICAL FIELD

The disclosure relates to the technical field of metal material preparation, and in particular to a device for improving quality of aluminum alloy horizontal continuous casting billet by applying ultrasonic treatment.

BACKGROUND

Horizontal continuous casting technology has the advantages of low cost, short process, producing large-section casting billets, and unlimited production length, which is an important method to prepare high-quality billets. However, horizontal continuous casting also has some shortcomings, such as uneven circumferential structure of casting billet, difficult removal of inclusions and segregation of solute elements inside the casting billet. In recent years, the application of power ultrasound in material processing and treatment has attracted the attention of researchers. When propagating in liquid medium, the power ultrasound produces cavitation effect, acoustic flow effect, mechanical effect, thermal effect, etc. These effects will cause the changes of flow field, pressure field and temperature field in the fluid, and then refine the solidification structure and solve the problem of solute element segregation inside the casting billet. Ultrasonic treatment belongs to physical external field modification technology, and does not change the metal composition. Therefore, ultrasonic treatment is an ideal method to improve quality of horizontal continuous casting billet.

Publication No. CN101244451A discloses a method and a device for improving quality of horizontal continuous casting billet by applying composite field. In the disclosure, a power ultrasonic device is arranged near the water inlet of the holding furnace, and a restraining electromagnetic coil is arranged outside the crystallizer to improve the quality of horizontal continuous casting billets.

Publication No. CN108188362A discloses a method and a device for preparing CuNiSn series alloy and strip billet under combined external field by horizontal continuous casting. In the disclosure, an ultrasonic generator is arranged in the crystallizer, and the ultrasonic generator is 2-10 centimeters away from the inlet of the crystallizer.

The propagation of ultrasound is directional, and cavitation effect of ultrasound in liquid only exists in a small range at the top end of the ultrasonic probe. Only when ultrasound directly acts on the liquid-solid interface of the liquid cavity, can the microstructure of the casting billet be refined and the solute segregation of the horizontal continuous casting billet be improved. In the above applications, ultrasound only treats the liquid in the holding furnace or tundish, but fails to realize the function of directly treating the metal liquid in the liquid cavity.

Publication No. CN104057040A discloses a device for applying ultrasonic vibration for horizontal continuous casting of gear steel and a method thereof. In the disclosure, the molten steel outlet is connected with a horizontal continuous casting crystallizer, the outer side wall of a copper plate at the bottom of the crystallizer is provided with a bottom ultrasonic guide rod, the outer side wall of a copper plate at the top of the crystallizer is provided with a top ultrasonic guide rod, the outer side wall of a copper plate at the first side of the crystallizer is provided with a first side ultrasonic guide rod, and the outer side wall of a copper plate at the second side of the crystallizer is provided with a second side ultrasonic guide rod. Ultrasonic vibration is generated on the horizontal continuous casting crystallizer, which makes the inner wall of the crystallizer get good lubrication conditions, reduces the friction between the billet and the inner wall of the crystallizer, and prevents the molten steel from sticking to the inner wall. The disclosure improves the surface quality of the horizontal continuous casting billet through the ultrasonic vibration crystallizer, but does not improve the internal quality of the horizontal continuous casting billet.

Therefore, it is urgent to design a device for improving quality of aluminum alloy horizontal continuous casting billet by applying ultrasonic treatment.

SUMMARY

The objective of the disclosure is to provide a device for improving quality of aluminum alloy horizontal continuous casting billet by applying ultrasonic treatment, so as to solve the problems existing in the prior art, realizes that ultrasound is capable of directly treating aluminum alloy liquid at a liquid cavity, improve the internal quality of the horizontal continuous casting billet by utilizing cavitation effect and acoustic flow effect, refine crystal grains and improve the problem of solute segregation.

In order to achieve the above objective, the disclosure provides the following solution. A device for improving quality of aluminum alloy horizontal continuous casting billet by applying ultrasonic treatment includes an ultrasonic generator, an ultrasonic transducer, an amplitude transformer, a holding furnace, an ultrasonic probe and a traction device. The ultrasonic generator is electrically connected with the ultrasonic transducer; the ultrasonic transducer is threadedly connected with the ultrasonic probe through the amplitude transformer, and the ultrasonic probe is placed in the holding furnace; a communication opening is formed at a bottom of the holding furnace, and the traction device is installed at the communication opening; the holding furnace is further poured with metal liquid.

The ultrasonic probe includes a vertical probe and a horizontal probe. The vertical probe is vertically arranged, and a top end of the vertical probe is threadedly connected with the amplitude transformer, an end of the horizontal probe is threadedly connected with a bottom end of the vertical probe.

The vertical probe and the horizontal probe are both made of graphite.

The end of the horizontal probe is provided with an oblique angle of 44.8-45.5 degrees.

Optionally, an other end of the horizontal probe is located in a liquid cavity of the aluminum alloy horizontal continuous casting billet of the holding furnace.

Optionally, a crystallizer is further installed on the traction device.

Optionally, an ultrasonic frequency of the ultrasonic generator is 20 kilohertz, and an ultrasonic power of the ultrasonic generator is 100-6000 watts.

The disclosure has following technical effects. The aluminum alloy liquid at the liquid cavity is directly treated by ultrasound, and the internal quality of the horizontal continuous casting billet is improved by utilizing cavitation effect and acoustic flow effect, so that crystal grains are refined, and the problem of solute segregation is improved.

BRIEF DESCRIPTION OF THE DRAWINGS

In order to explain the embodiments of the present disclosure or the technical solution in the prior art more clearly, the drawings needed in the embodiments will be briefly introduced below. Apparently, the drawings in the following description are only some embodiments of the present disclosure. For a person of ordinary skill in the art, other drawings may be obtained according to these drawings without creative efforts.

FIG. is a schematic diagram of an overall structure of a device for improving quality of aluminum alloy horizontal continuous casting billet by applying ultrasonic treatment according to the embodiment of the present disclosure.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In order to make the above objectives, features and advantages of the present disclosure more apparent and easier to understand, the present disclosure will be further described in detail with the attached drawings and specific embodiments.

As shown in FIG., the present disclosure provides a device for improving quality of aluminum alloy horizontal continuous casting billet by applying ultrasonic treatment, including an ultrasonic generator 1, an ultrasonic transducer 2, an amplitude transformer 3, a holding furnace 4, an ultrasonic probe and a traction device 9. The ultrasonic generator 1 is electrically connected with the ultrasonic transducer 2; the ultrasonic transducer 2 is threadedly connected with the ultrasonic probe through the amplitude transformer 3, and the ultrasonic probe is placed in the holding furnace 4. A communication opening is formed at a bottom of the holding furnace 4, and the traction device 9 is installed at the communication opening. Further, the holding furnace 4 is poured with metal liquid 5.

The ultrasonic probe includes a vertical probe 6 and a horizontal probe 7. The vertical probe 6 is vertically arranged, and a top end of the vertical probe is threadedly connected with the amplitude transformer 3, one end of the horizontal probe 7 is threadedly connected with a bottom end of the vertical probe 6.

The vertical probe 6 and the horizontal probe 7 are both made of graphite.

The end of the horizontal probe 7 is provided with an oblique angle of 44.8-45.5 degrees.

In the embodiment, an other end of the horizontal probe 7 is located in a liquid cavity 12 of the aluminum alloy horizontal continuous casting billet of the holding furnace 4.

In the embodiment, a crystallizer 8 is further installed on the traction device 9.

In the embodiment, an ultrasonic frequency of the ultrasonic generator 1 is 20 kilohertz, and an ultrasonic power of the ultrasonic generator 1 is 100-6000 watts.

In another embodiment of the present disclosure, the vertical probe 6 and the horizontal probe 7 are both made of high-strength graphite.

In yet another embodiment of the present disclosure, when the sound wave propagates from one medium to another medium, a part of the sound wave is reflected at the interface between the two media, and the other part of sound wave is transmitted through the interface and propagates in the other medium. When the wave is reflected at the interface, the ratio of the sine of the incident angle to the sine of the reflection angle is equal to the ratio of the wave velocities of the sound wave in the media. When the wave refracts at the interface, the ratio of sine of incident angle to sine of refraction angle is equal to the ratio of wave velocity of incident wave in the first medium to wave velocity of refracted wave in the second medium. And when the refraction angle is greater than 90 degrees, the sound wave is totally reflected.

Further, during ultrasonic treatment of aluminum liquid by ultrasonic probe, when ultrasonic wave propagates to graphite-aluminum liquid interface 10 through the vertical probe 6, the propagation direction of reflected wave is parallel to that of the horizontal probe 7. Because the vertical probe 6 and the horizontal probe 7 are made of the same material, the incident angle and the reflection angle are equal and are both 45 degrees. And according to the sound propagation characteristics of sound waves in aluminum and graphite, when the incident angle exceeds about 23 degrees, the refraction angle is greater than 90 degrees, that is, total reflection occurs, so refracted waves are not generated. When the reflected wave further propagates to the interface 11 between graphite and aluminum alloy liquid at the other end of the horizontal probe 7, the incident angle is 0 degree, and about 60% of the acoustic energy propagates into the aluminum alloy liquid. By moving the position of the ultrasonic generator 1 above the holding furnace 4, the other end of the horizontal probe 7 is located in the liquid cavity 12 of the aluminum alloy continuous casting billet, so that the ultrasonic wave directly acts on the liquid cavity of the aluminum alloy continuous casting billet, and the aluminum alloy horizontal continuous casting billet with grain refinement, and uniform composition and high quality is obtained.

In the description of the present disclosure, it should be understood that the terms "longitudinal", "transverse", "up", "down", "front", "back", "left", "right", "vertical", "horizontal", "top", "bottom", "inside", "outside", etc. indicate orientation or positional relationships based on the orientation or positional relationships shown in the drawings, solely for the convenience of describing the present disclosure, instead of indicating or implying that the device or component referred to must have a specific orientation, be constructed and operated in a specific orientation, they cannot be understood as a limitation of the present disclosure.

The above-mentioned embodiments only describe the preferred mode of the disclosure, and do not limit the scope of the disclosure. Under the premise of not departing from the design spirit of the disclosure, various modifications and improvements made by those of ordinary skills in the art to the technical solutions of the present disclosure shall fall within the protection scope of the present disclosure.

What is claimed is:

1. A device for improving quality of aluminum alloy horizontal continuous casting billet by applying ultrasonic treatment, comprising an ultrasonic generator, an ultrasonic transducer, an amplitude transformer, a holding furnace, an ultrasonic probe and a traction device, wherein the ultrasonic generator is electrically connected with the ultrasonic transducer; the ultrasonic transducer is threadedly connected with the ultrasonic probe through the amplitude transformer, and the ultrasonic probe is placed in the holding furnace; a communication opening is formed at a bottom of the holding furnace, and the traction device is installed at the communication opening; the holding furnace is further poured with metal liquid; the ultrasonic probe comprises a vertical probe and a horizontal probe; the vertical probe is vertically arranged, and a top end of the vertical probe is threadedly connected with the amplitude transformer, an end of the horizontal probe is threadedly connected with a bottom end of the vertical probe; the vertical probe and the horizontal probe are both made of graphite;

the end of the horizontal probe is provided with an oblique angle of 44.8-45.5 degrees.

2. The device for improving quality of aluminum alloy horizontal continuous casting billet by applying ultrasonic treatment according to claim 1, wherein an other end of the horizontal probe is located in a liquid cavity of the aluminum alloy horizontal continuous casting billet of the holding furnace.

3. The device for improving quality of aluminum alloy horizontal continuous casting billet by applying ultrasonic treatment according to claim 1, wherein a crystallizer is further installed on the traction device.

4. The device for improving quality of aluminum alloy horizontal continuous casting billet by applying ultrasonic treatment according to claim 1, wherein an ultrasonic frequency of the ultrasonic generator is 20 kilohertz, and an ultrasonic power of the ultrasonic generator is 100-6000 watts.

* * * * *